(12) United States Patent
Zakarias et al.

(10) Patent No.: US 9,369,558 B2
(45) Date of Patent: Jun. 14, 2016

(54) HANDS-FREE COMMUNICATION DEVICES FOR CORDED AND WIRELESS COMMUNICATION

(71) Applicants: Karsten Zakarias, Copenhagen (DK); Michael Sødal Schwartz, Regstrup (DK); Ole Birch, Nærum (DK)

(72) Inventors: Karsten Zakarias, Copenhagen (DK); Michael Sødal Schwartz, Regstrup (DK); Ole Birch, Nærum (DK)

(73) Assignee: GN Netcom A/S (DK)

( * ) Notice: Subject to any disclaimer, the term of this patent is extended or adjusted under 35 U.S.C. 154(b) by 178 days.

(21) Appl. No.: 13/928,559

(22) Filed: Jun. 27, 2013

(65) Prior Publication Data

US 2014/0018013 A1 Jan. 16, 2014

(30) Foreign Application Priority Data

Jun. 29, 2012 (EP) ..................................... 12174488

(51) Int. Cl.
*H04M 1/60* (2006.01)

(52) U.S. Cl.
CPC .......... *H04M 1/6041* (2013.01); *H04M 1/6058* (2013.01); *H04M 1/6066* (2013.01)

(58) Field of Classification Search
CPC H04M 1/6041; H04M 1/6058; H04M 1/6066
See application file for complete search history.

(56) References Cited

U.S. PATENT DOCUMENTS

| | | | | |
|---|---|---|---|---|
| 5,590,417 A | * | 12/1996 | Rydbeck | H04M 1/0258 379/428.02 |
| 8,688,174 B2 | * | 4/2014 | Latham | H04M 1/0258 381/370 |
| 8,731,225 B2 | * | 5/2014 | Tang | H04M 1/05 379/433.03 |
| 2004/0185915 A1 | * | 9/2004 | Ihara et al. | 455/569.1 |
| 2005/0130593 A1 | * | 6/2005 | Michalak | G08B 21/24 455/66.1 |
| 2006/0068857 A1 | * | 3/2006 | Asseily | 455/575.2 |
| 2008/0057858 A1 | * | 3/2008 | Smith | 455/3.05 |
| 2012/0058737 A1 | * | 3/2012 | Sims | H01R 11/00 455/88 |
| 2012/0094638 A1 | * | 4/2012 | Shamoon et al. | 455/414.1 |
| 2012/0206096 A1 | * | 8/2012 | John | A61N 1/3785 320/108 |

FOREIGN PATENT DOCUMENTS

WO WO 2007035021 A1 * 3/2007 .......... H04R 1/1041
WO WO 2008/082939 7/2008

OTHER PUBLICATIONS

European Search Report for European application No. 12174488.2 dated Nov. 22, 2012.

* cited by examiner

*Primary Examiner* — Gennadiy Tsvey
(74) *Attorney, Agent, or Firm* — Altera Law Group, LLC

(57) ABSTRACT

Wireless communication between a hands-free communication device and a telecommunication device is provided. A hands-free communication system and a method of enabling wireless communication between a telecommunication device (2) and a hands-free communication device (1), is provided wherein the hands-free telecommunication device (1) is connected to a first transceiver (8), and the telecommunication device (2) is connected to a second transceiver (9), the first transceiver (8) and the second transceiver (9) being connected by releasable connection (10), wherein the first transceiver and the second transceiver are activated upon disengagement of the releasable connection.

14 Claims, 6 Drawing Sheets

HANDS-FREE COMMUNICATION DEVICES FOR CORDED AND WIRELESS COMMUNICATION

TECHNICAL FIELD

The present invention relates to hands free communication devices, such as headsets and/or speakerphones, and particularly to connections between hands-free communication devices and telecommunication devices, such as personal computers, desk phones, mobile phones, etc, and furthermore to a method of activation of a wireless connection upon disengagement of a wired connection. The invention still further relates to a wireless kit configured to enable wireless communication between a telecommunication device and a hands-free communication device.

BACKGROUND

Headsets, and especially headsets with built-in microphones and speakerphones for communication purposes have become quite common as they allow for hands free use of the telecommunication device, and are thus typically employed for office use, for use while moving, such as when driving, walking, etc. and the headsets may thus connect to mobile phones, telephone devices, such as desk phones, soft phones, IP phones, etc, or to any number of these telecommunication devices.

Such headsets are configured to be connected with the telecommunication device either wirelessly, or via a wire either to a port of the mobile telephone, a port of a computer, a handset port or a specifically provided headset port of the telephone device. However, the mobile phone typically use a built in Bluetooth connection to connect to the headset, the computer may use another Bluetooth connection to connect to the headset, and for a telephone device, the set up of the headset is specific to the specific telephone device, manufacturer, telephone type, make, etc.

Both wireless and wired headsets are commonly used, and while wireless headsets are convenient in use, as a user is able to move around and or move the speakerphone without being limited by the length of a cord and the risk of cord entanglement, they also have their disadvantages as the wireless devices require recharging and sometimes suffer from poor audio quality.

The opposite is the case with corded headsets and speakerphones. They are always ready for use as they do not need recharging and the audio quality is not influenced by a wireless connection. However, the cord limits the movement of the device and if the cord is long, the cord gets easily entangled with furniture etc.

SUMMARY OF INVENTION

It is an object of the present invention to provide a combination of a corded and a wireless device.

In one aspect of the present invention, a hands-free communication system, such as a headset system and/or a speakerphone system, is provided, the system being configured for audio communication between a hands-free communication device and a telecommunication device using a wireless or a corded connection. The hands-free communication system may comprise a hands-free communication device having a speaker, and a first cable having a hands-free connector part in one end and being connected to the hands-free communication device in another end. Furthermore, a telecommunication device connector part may be configured to connect to a telecommunication device. A line of communication may be provided between the telecommunication device connector part and the hands-free connector part. The communication line may comprise a first transceiver and a second transceiver being configured to establish a wireless connection there between upon activation. The communication line may further comprise a releasable connection positioned between the first transceiver and the second transceiver configured to establish a corded connection, such as an audio corded connection and/or an electrical corded connection, between the hands-free communication device and the telecommunication device when the releasable connection is connected. The first transceiver may be provided in the first connector part or the first transceiver may be provided along the communication line between the first connector part and the releasable connection. The second transceiver may be provided in the telecommunication device connector part or along the communication line between the telecommunication device connector part and the releasable connection. Hereby, a wireless connection between the first transceiver and the second transceiver may be enabled upon activation of the first transceiver and the second transceiver, respectively.

In a further aspect of the present invention, a wireless kit configured to enable optional corded and wireless communication between a telecommunication device and a hands-free communication device, is provided. The hands-free communication device, which do not necessarily form part of the kit, may have a first cable having a hands-free connector part in one end and being connected to the hands-free communication device in another end. The wireless kit may comprise a telecommunication device connector part configured to connect to a telecommunication device. A communication line may be provided between the telecommunication device connector part and the hands-free connector part. The communication line may comprise a first transceiver and a second transceiver being configured to establish a wireless connection there between upon activation. A releasable connection may be positioned between the first transceiver and the second transceiver for establishing a corded connection, such as an audio corded connection and/or an electrical corded connection, between the hands-free communication device and the telecommunication device when connected. The first transceiver may be provided in the first connector part or the first transceiver may be provided between the first connector part and the releasable connection. The second transceiver may be provided in the telecommunication device connector part or the second transceiver may be provided between the telecommunication device connector part and the releasable connection.

In a still further aspect of the present invention a wireless kit configured to enable wireless communication between a telecommunication device and a hands-free communication device is provided, the hands-free communication device may have a first cable having a hands-free connector part in one end and may be connected to the hands-free communication device in another end. The telecommunication device may have a telecommunication device connector part configured to connect to a telecommunication device. The wireless kit may comprise a first transceiver configured to connect to the hands-free connector part, and a second transceiver configured to connect to the telecommunication device connector part. A releasable connection may be positioned between the first transceiver and the second transceiver. The first transceiver and the second transceiver may be configured to establish a wireless connection there between upon activation.

Hereby, a wireless connection between the first transceiver and the second transceiver may be enabled upon activation of the first transceiver and the second transceiver, respectively.

In another aspect of the present invention, a method of enabling wireless communication between a telecommunication device and a hands-free communication device is provided, wherein the hands-free telecommunication device is connected to a first transceiver, and the telecommunication device is connected to a second transceiver. The first transceiver and the second transceiver may be connected by a releasable connection, and the first transceiver and the second transceiver may be activated upon disengagement of the releasable connection.

It is an advantage of the present invention that a user may switch between a corded and a wireless use of a hands-free communication device, easily and swiftly without interruptions in the communication and/or without having to connect another hands-free communication device, such as to another headset, or another speakerphone. Thereby, a user may have the convenience of a wired headset when being seated at a desk working and communicating using the wired headset, and the flexibility of disengaging the corded connection when the circumstances so require, and e.g. move to a quiet office or retrieve documents required e.g. during a telephone call. It is a further advantage that the telecommunication device sees the same hands-free communication device, i.e. the same headset or speakerphone, whether these are connected to the telecommunication device via a corded or a wireless connection.

The first and second transceivers may be any conventional transceivers capable of providing a wireless link there between, the wireless link being capable of transferring data, such as communication data, such as audio and/or voice communication data between the two transceivers. The wireless link may be any link, such as a radio link, such as a link according to any wireless standard such as a Bluetooth standard, a wireless standard, such as a standard according to 802.11b-g, such as a wireless USB, such as a PHS link or DECT link specifically configured for voice communication, etc.

It is a further advantage of the present invention that the first transceiver and the second transceiver may be tailored to establish a wireless connection there between. Thus, the wireless connection may be established without relying on third party software, configurations, such as telecommunication device configurations, protocols, such as telecommunication device protocols, etc. A wireless communication being both more stable and of a better quality may be obtained by providing a dedicated set of transceivers for wireless communication.

The hands-free communication device may be a headset or a speakerphone, etc. The headset may have one or two speakers, and may furthermore comprise a microphone. Still further, the headset may have speakerphone functionality. It is envisaged, that even though the following description uses a headset as the example, also a speakerphone may be used. The speakerphone may comprise one or more loudspeakers and/or one or more microphones.

The first cable may be permanently connected to the hands-free communication device. Alternatively, the first cable may be releasably connected to the hands-free communication device, so as to e.g. allow for post-mounting of a wireless kit. It is however an advantage of providing a releasable connection away from the hands-free communication device itself, such as away from the headset, as the headset is a delicate structure and it may be inconvenient and give rise to noise signals in the communication when releasing or attaching a connector directly to the headset. Furthermore, when a change from corded operation to wireless operation, or vice versa, is desired, the headset is typically positioned at a user's ear(s) making it inconvenient for a user to attach or release a connection close to the ear, without being able to actually see the connectors. It is envisaged that the term cable is to be interpreted broadly to mean any means, such as cable, wire, line, etc., capable of providing a connection, electrical and/or audio, between the hands-free communication device and a hands-free connector part.

In one or more embodiments, the first cable is thus connected to the hands-free communication device in one end and has a hands-free connector part in the other end.

The first transceiver may be an external headset transceiver, that is a transceiver for receiving communication signals intended for the headset and/or transmitting communication signals generated at the headset intended for e.g. a telecommunication device, but being positioned outside of any headset housing. The external headset transceiver may be configured to connect to the headset using a corded connection, such as a cable, such as the first cable.

The second transceiver may be an external telecommunication device transceiver, that is a transceiver for receiving communication signals intended for the telecommunication device and/or transmitting communication signals generated at the telecommunication device to e.g. a hands-free communication device, such as a headset or a speakerphone. The second transceiver may be configured to connect to the telecommunication device via a telecommunication device connector part, and the second transceiver and the telecommunication device connector part may be connected in any known manner, either directly via the connector, via an adapter and/or via a corded connection to provide a connection between the second transceiver and the telecommunication device connector part. The telecommunication device connector part may be a USB type connector part, a micro USB type connector part, a connector part for a telephone device handset or headset port, to a connector part for a mobile telephone, etc.

The first transceiver and the second transceiver may be provided along a line of communication between the telecommunication device connector part and the hands-free connector part. The communication line may, thus, comprise the first transceiver and the second transceiver. The first transceiver and the second transceiver may be configured to establish a wireless connection there between, typically, the wireless connection will be activated upon activation of the first transceiver and the second transceiver.

The communication line may further comprise a releasable connection positioned between the first transceiver and the second transceiver for establishing a corded connection, such as an audio corded connection and/or an electrical corded connection, between the hands-free communication device and the telecommunication device when the releasable connection is connected.

In one or more embodiments, the hands-free communication system, such as the headset system, the speakerphone system and/or the wireless kit may comprise a first connector part being interconnected with the first transceiver and a second connector part being interconnected with the second transceiver wherein the first connector part and the second connector part form a releasable connection there between.

The first connector part, the second connector part and/or the hands-free connector part may be any connector parts configured for releasable connection. The connector parts may be configured for locking by snapping, twisting, push/pull actions, etc., or any combination thereof. For example, at least one of connector parts, such as at least one of the hands-free connector part, the first connector part, the second connector part and/or a further connector part is a hermaphroditic connector part.

In one or more embodiments of the present invention, the first transceiver and the second transceiver may be provided anywhere along the communication line while still be interconnected by the first and second connector parts. For example, the first connector part may comprise the first transceiver, and/or the second connector part may comprise the second transceiver. In a further example, the telecommunication device connector part may comprise the second transceiver and/or the second connector part. In a still further example, the hands-free connector part may comprise the first transceiver and/or the first connector part.

The first transceiver and the second transceiver may be configured to enable communication between the headset and the telecommunication device. In one or more embodiments, the wireless connection, such as a wireless link, may be established upon activation of the first transceiver and the second transceiver. The hands-free communication system, such as the headset system or speakerphone system, or the wireless kit may thus further comprise an activation mechanism so that the first transceiver and the second transceiver may be activated or switched on when a user desires to establish a wireless connection.

The first transceiver and the second transceiver may for example be activated upon disengagement of the releasable connection. The activation mechanism may, thus, for example be provided in the first and/or second connector part and may be activated by disengaging the releasable connection. Hereby, a wireless link is established directly after disengagement.

The corded connection between the first connector part and the second connector part may furthermore transfer power from e.g. the telecommunication device to the first and/or second transceivers, and possibly to further electronic circuits in the hands-free communication device. The first transceiver and the second transceiver may thus further be provided with a rechargeable battery which may enable the functioning of the wireless connection.

In some embodiments, the user may want to shift frequently or swiftly between a wireless and a corded connection, and therefore, in some embodiments, it may be advantageous to enable the wireless link also when the first connector part and the second connector part are connected. Thus, it may be possible, for example via the telecommunication device or via any interface to the transceivers to indicate that the first transceiver and the second transceiver may be permanently activated to maintain a wireless link between the first transceiver and the second transceiver also when a corded connection is established between the headset and the telecommunication device.

In this way, one of the disadvantages of the wireless communication connection is overcome, in that the set up time for the wireless connection is eliminated whereas the headset and/or the speakerphone and/or the first transceiver and/or the second transceiver may receive charging power from the telecommunication device via the corded connection.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Like elements will, thus, not be described in detail with respect to the description of each figure.

DETAILED DESCRIPTION OF THE DRAWING

In the following detailed description of the invention, a hands-free communication device is shown to be a headset or a speakerphone. In the FIGS. 1-11 and 15, a headset is shown, while a speakerphone is shown in FIG. 12. It is however envisaged that a speakerphone may be used in any of the embodiments showing a headset, and vice versa.

Figure 1:
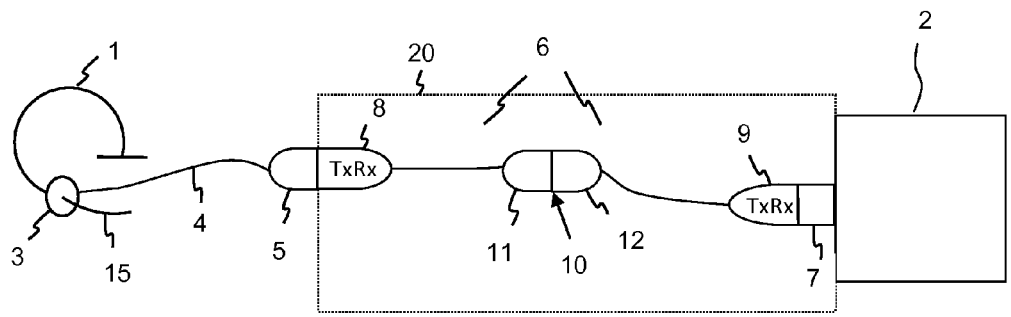
FIG. 1 shows schematically a line of communication between a headset and/or a speakerphone 1 and a telecommunication device 2.
Figure 2:
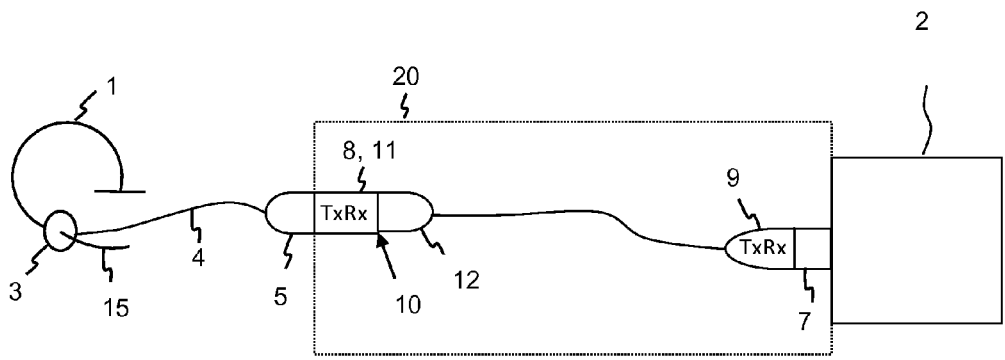
FIG. 2 shows another line of communication between a headset 1 and a telecommunication device 2.

FIG. 1 shows schematically a line of communication 6 between a headset 1 and a telecommunication device 2. The hands-free communication device system illustrated is configured for audio communication between a hands-free communication device 1 and a telecommunication device 2 using a wireless 14 or a corded connection. The headset has a speaker 3, a microphone 15, and a first cable 4 having a hands-free connector part 5, in present case being a headset connector part 5 in one end and being connected to the headset 1 in another end. A telecommunication device connector part 7 configured to connect to a telecommunication device 2, and provide a communication line 6 between the telecommunication device connector part 7 and the headset connector part 5. The communication line 6 comprises a first transceiver 8 and a second transceiver 9 being configured to establish a wireless connection 14 there between upon activation. The system further comprises a releasable connection 10 positioned between the first transceiver 8 and the second transceiver 9 establishing a corded connection audio and/or electrical between the headset 1 and the telecommunication device 2 when connected. The first transceiver 8 is provided in the first connector part 5 which is configured to connect to the headset connector part. The second transceiver 9 is provided in the telecommunication device connector part 7. The first connector part 11 and the second connector part 12 are connected using a releasable connection 10.

Figure 3:
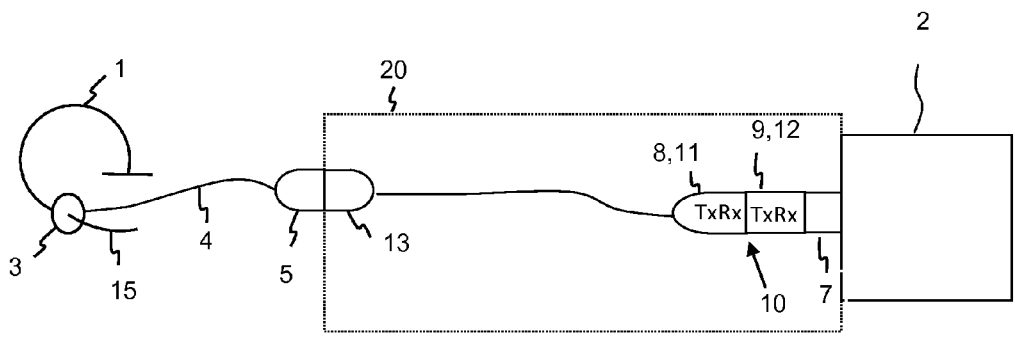
FIG. 3 shows a further line of communication between a headset 1 and a telecommunication device 2.

In FIG. 3, the headset connector part 5 connects to a further connector part 13, which in turns connect to the second connector part 12, and a releasable connection is established between the first transceiver 8 provided in the first connector part 11.

FIG. 3 shows a further line of communication between a headset 1 and a telecommunication device 2 wherein the headset connector part 5 connects to a further connector part 13, which in turns connect to the first transceiver being releasable attached to the second transceiver providing a releasable connection 10 between the first and second transceiver.

Figure 4:
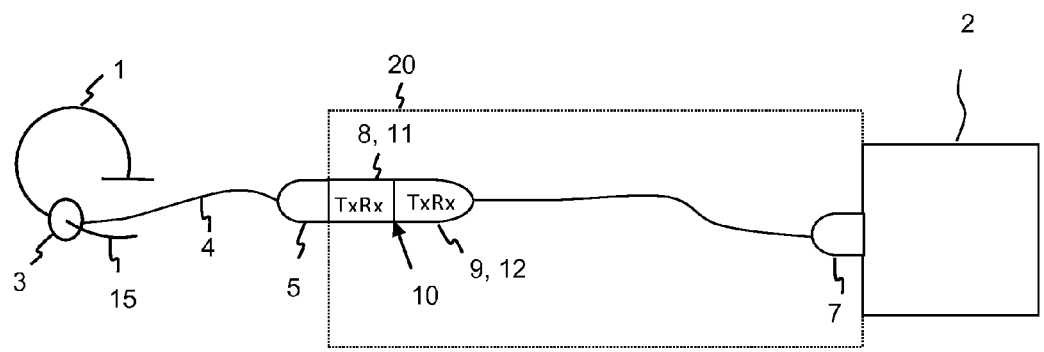
FIG. 4 shows a still further line of communication between a headset 1 and a telecommunication device 2.

FIG. 4 shows a still further line of communication between a headset 1 and a telecommunication device 2 wherein the headset connector part 5 connects directly to the first transceiver 8 in the first connector part 11 and the second transceiver 9 in the second connector part 12, establishing again a releasable connection between the first transceiver 8 and the second transceiver 9. The second transceiver 9 is via a wire or cable connected to the telecommunication device connector part 7.

Figure 5:
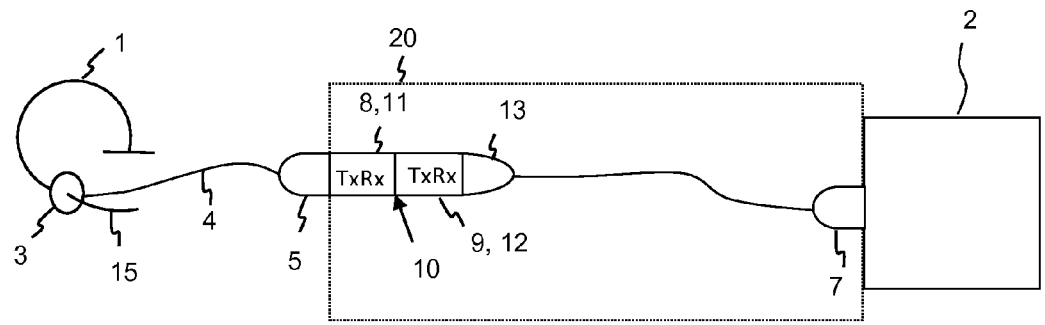
FIG. 5 shows a further line of communication between a headset 1 and a telecommunication device 2 having a wireless kit 20.

FIG. 5 shows a further line of communication between a headset 1 and a telecommunication device 2 wherein the headset connector part 5 connects directly to the first transceiver 8 in the first connector part 11 and the second transceiver 9 in the second connector part 12, establishing a releasable connection between the first transceiver 8 and the second transceiver 9. The second transceiver 9 is connected to a further connector part 13 which via a wire or cable connected to the telecommunication device connector part 7. The wireless kit 20 is seen to comprise the first transceiver 8, the first connector part 11, the second transceiver 9, the second connector part 12, and a further connector part 13 interconnected with the telecommunication connector part 7.

Figure 6:
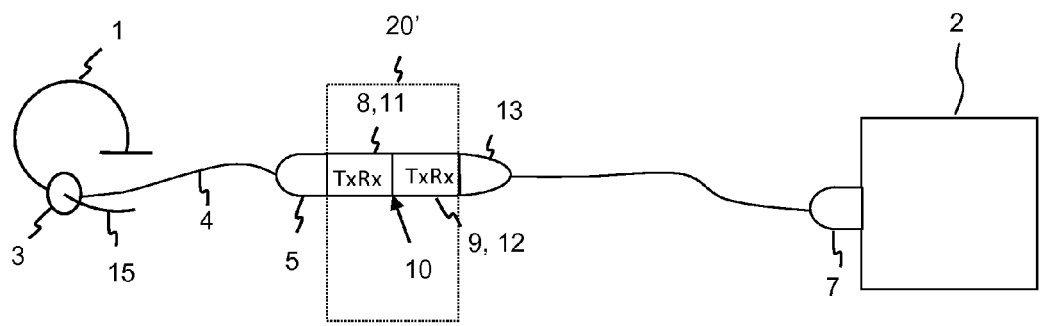
FIG. 6 shows a line of communication having another wireless kit 20'.

FIG. 6 shows a line of communication between a headset 1 and a telecommunication device 2 as in FIG. 5. It is seen in FIG. 6, that the wireless kit 20' comprises the first transceiver 8, the first connector part 11, the second transceiver 9, and the second connector part 12. The kit thus may consist of the first transceiver 8, the first connector part 11, the second transceiver 9, and the second connector part 12.

It is an advantage of providing a wireless kit 20' comprising the first and second transceivers 8, 9 and connectors 11, 12 for connecting to other connectors, such as the hands-free connector part, etc., as such a wireless kit may be used for subsequently equipping a standard corded headset with a wireless feature, as the standard headsets typically connect to a telecommunication device using a pair of quick-connect connector pairs, in between which the wireless kit 20' may fit.

Figure 7A:
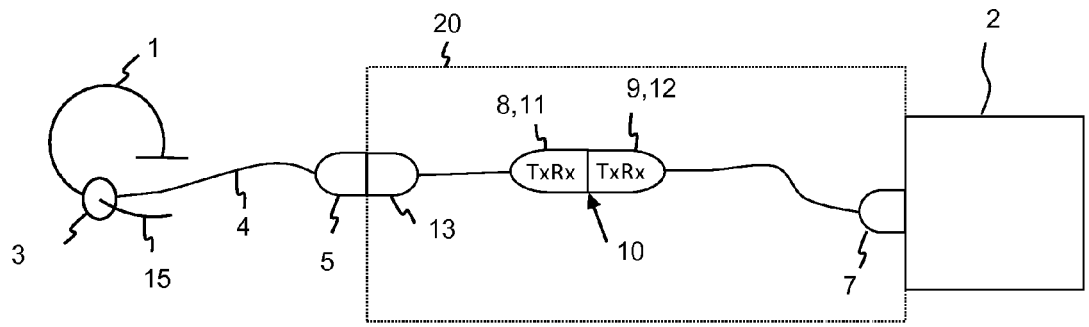
FIG. 7a shows one embodiment of the invention wherein the first and second connector parts are engaged.
Figure 7B:
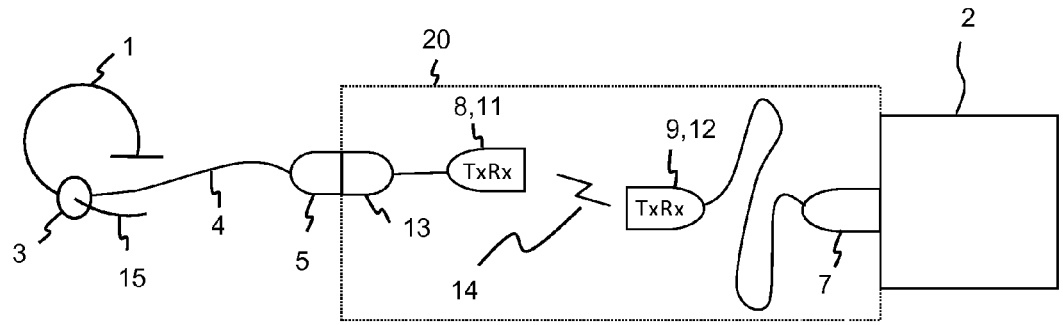
FIG. 7b shows the same embodiment as in FIG. 7a wherein the connection is wireless.
Figure 7C:
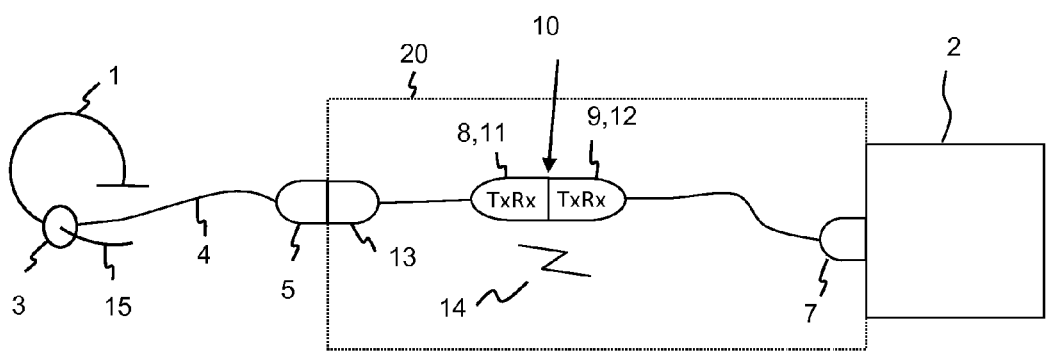
FIG. 7c shows an embodiment having concurrently a corded and a wireless connection.

FIGS. 7a-7c show different engagement of the releasable connection. In FIG. 7a, the first and second connector parts 11, 12 comprising the first and second transceivers 8, 9 are releasably connected. FIG. 7b shows the same embodiment as in FIG. 7a wherein the releasable connection is disengaged and the connection between the first transceiver 8 and the second transceiver 9 is wireless. In FIG. 7c an embodiment having concurrently a corded and a wireless connection is shown.

Figure 8:
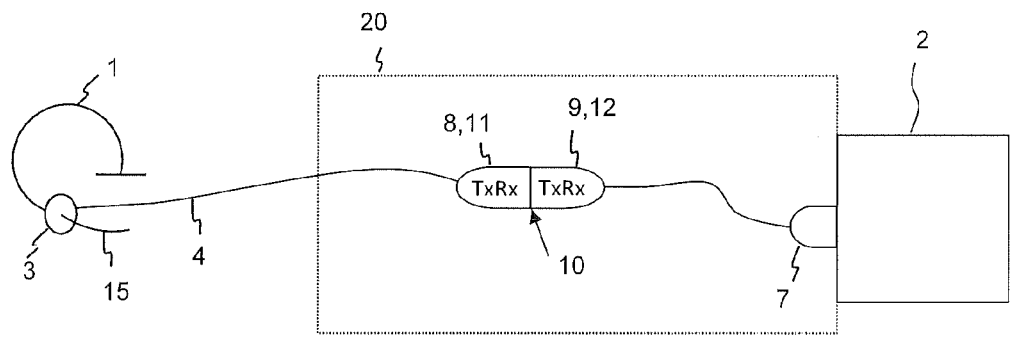
FIGS. 8-11 show a number of different embodiments in which the headset 1 has a transceiver connected to the headset.

FIG. 8 shows an embodiment in which the headset connector part 5 comprises the transceiver 8 and the first connector part 11 and connects releasably to the second transceiver 9 provided in the second connector part 12.

Figure 9:
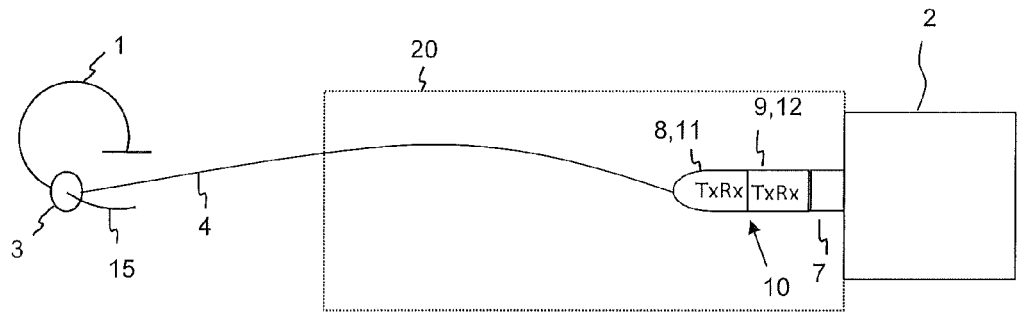

FIG. 9 shows an embodiment in which the headset connector part 5, the first and second connector part 11, 12 the first and second transceiver 8, 9 and the telecommunication device connector part 7 are provided as one unit having a releasable connection between the first and second transceivers 8, 9.

Figure 10:
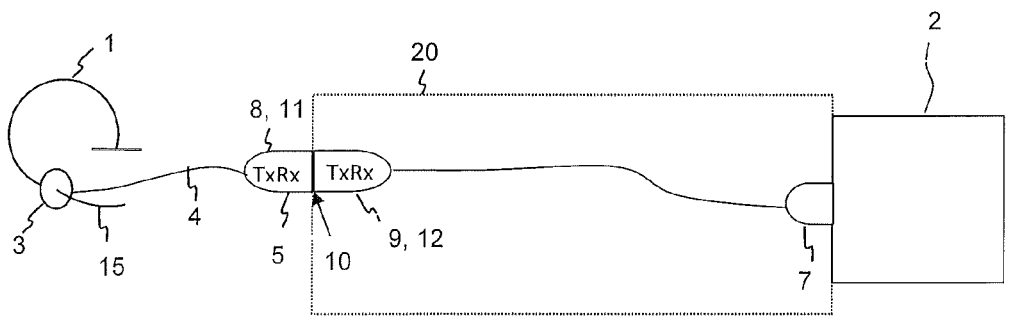

FIG. 10 shows a further embodiment wherein the headset connector part 5 comprises the transceiver, and the first connector part so as to allow for manufacturing of a headset 1 having an external transceiver 8, and still be able to use a wireless kit for connecting to the second transceiver 9.

Figure 11:
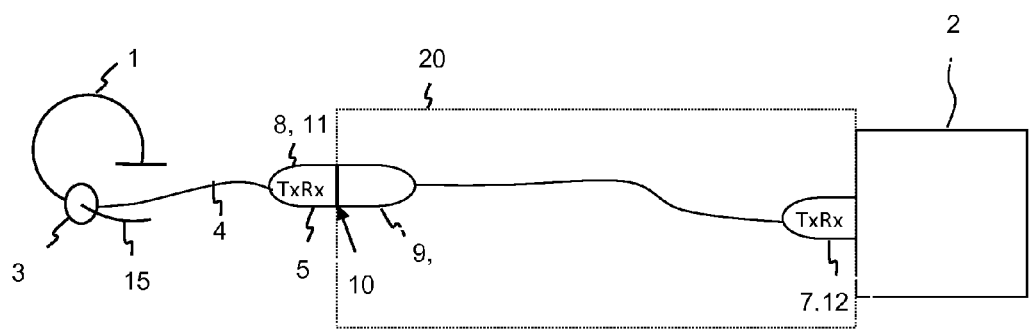
Figure 12:
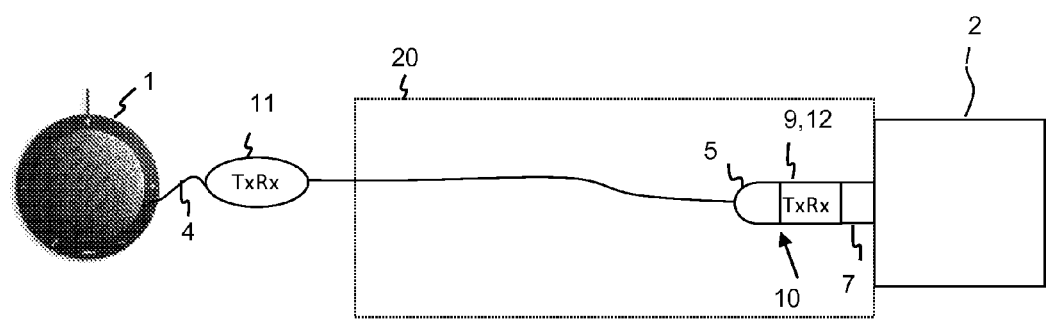
FIG. 12 shows a transceiver interconnected between a speakerphone and a first connector.

FIG. 11 shows a further embodiment having the first transceiver 8 built in into the headset connector part 5.

FIG. 12 shows a transceiver interconnected between a speakerphone 1 and a hands-free connector part 5. The releasable connection 10 is in this embodiment provided between the hands-free connector part 5 and a second transceiver 9 combined with the second connector part 12 and the telecommunication device connector part.

Figure 13:
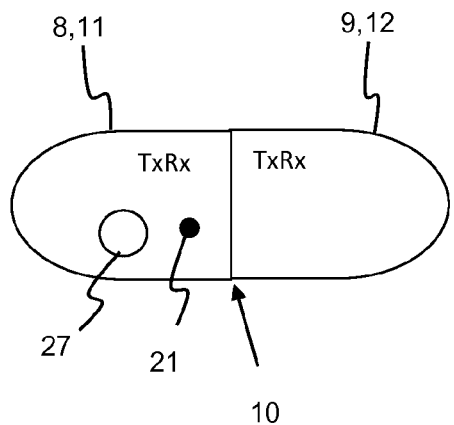
FIG. 13 shows an activation mechanism in connection with the releasable connection.

FIG. 13 shows an exemplary releasable connection between on one side a first connector part 11 comprising the first transceiver 8 and on the other side the second connector part 12 comprising the second transceiver 9. The activation mechanism 21 is shown in connection with the releasable connection, and the activation mechanism 21 may ensure activation of the first and second transceivers upon disengagement. A battery 27, such as a rechargeable battery, is provided in connection with the first transceiver in the first connector part 11. It is envisaged that at least one of the first and second connector parts 11, 12 may comprise the battery 27.

Figure 14:
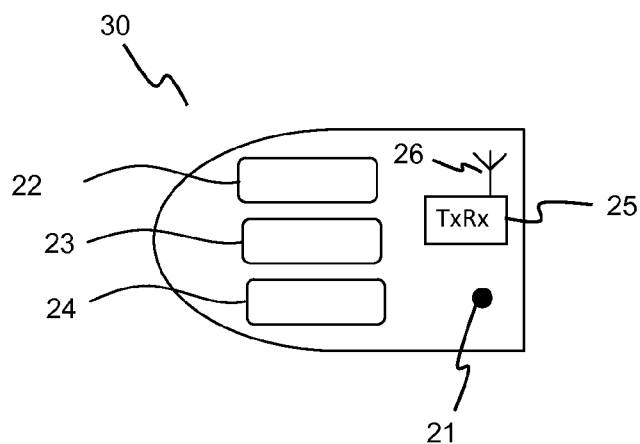
FIG. 14 shows a connector part, such as a hands-free connector part in more detail.

FIG. 14 shows a hands-free connector part 30 comprising the first connector part (the whole object shown in the figure) and transceiver 25 and corresponding antenna 26. In FIG. 14, the hands-free connector part user interface 22, 23, 24 is shown in more detail. The user interface may comprise a mute function 22, a call activation/deactivation function 23 and a volume function 24. The hands-free connector part may further comprise the activation mechanism 21.

Figure 15:
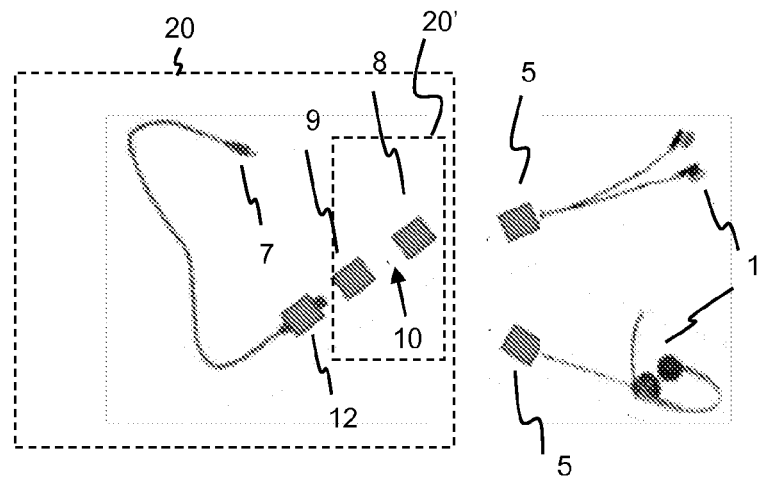
FIG. 15 illustrates how a wireless kit could be seen.

FIG. 15 shows a wireless kit 20 and a wireless kit 20' according to the present invention.

1 hands-free communication device, such as headset or speakerphone
2 telecommunication device
3 speaker
4 first cable
5 hands-free connector part, such as headset connector part or speakerphone connector part
6 communication line
7 telecommunication device connector part
8 first transceiver
9 second transceiver
10 releasable connection
11 first connector part
12 second connector part
13 further connector part
14 wireless connection
15 microphone
20 wireless kit
21 wireless activation
22 mute functionality
23 call activation/deactivation
24 volume functionality
25 transceiver
26 antenna
27 battery

The invention claimed is:
1. A wireless fall back in-line connector adapter for use with a hands-free communication system configured for audio communication between a hands-free communication device having a first wired connection cable and a telecommunication device having a second wired connection cable, the system comprising:
- a pair of first and second connectors having first and second parts, respectively, said first connector being electrically connected to said first wired connection cable, and said second connector being electrically connected to said second wired connection cable, said first and second connectors being mechanically and electrically separable from each other and further including:
- said first connector having a first wireless transceiver inside the first part electrically connected to said first wired connection cable;
- said second connector having a second wireless transceiver inside the second part electrically connected to said second wired connected cable,
- said first and second wireless transceivers being configured to permanently communicate with each other;
- said first and second connectors while being mated to each other providing an audio electrical and mechanical link between the hands-free communication device and the telecommunication device while the first and second wireless transceivers simultaneously provide a wireless link between said hands-free communication device and the telecommunication device, so that if the audio electrical and mechanical link is interrupted, the hands-free communication device and the telecommunication device will remain in constant unbroken wireless communication.

2. An adapter according to claim 1, wherein the first wired connection cable is permanently connected to the hands-free communication device.

3. An adapter according to claim 1, wherein the hands-free communication device further comprises a microphone.

4. An adapter according to claim 1, wherein the first wireless transceiver is an external hands-free transceiver configured to provide a corded connection with the hands-free communication device through the first wired connection cable.

5. An adapter according to claim 1, wherein the second wireless transceiver is an external telecommunication device transceiver configured to provide a corded connection with the telecommunication device through the second wired connection cable.

6. An adapter according to claim 1, wherein the first part and the second part forming a releasable connection there between.

7. An adapter according to claim 6, wherein the first part comprises the first wireless transceiver, and/or the second part comprises the second wireless transceiver.

8. An adapter according to claim 6, wherein at least one of the first part, the second part and a further connector part are hermaphroditic connector parts.

9. An adapter according to claim 1, wherein the second part is a USB type connector part.

10. An adapter according to claim 1, wherein the first wireless transceiver and the second wireless transceiver are permanently activated to maintain a wireless link between the first wireless transceiver and the second wireless transceiver also when a corded connection (audio and/or electrical) is established between the hands-free communication device and the telecommunication device.

11. An adapter according to claim 6, wherein the hands-free communication device is charged when the first part and the second part are connected.

12. An adapter according to claim 1, wherein the hands-free communication device is a headset or a speakerphone.

13. A wireless fall back in-line connector adapter for use with a hands-free communication system configured for audio communication between a hands-free communication device having a first wired connection cable and a telecommunication device having a second wired connection cable, the system comprising:
- a pair of first and second connectors having first and second parts, respectively, said first connector being electrically connected to said first wired connection cable, and said second connector being electrically connected to said second wired connection cable, said first and second connectors being mechanically and electrically separable from each other and further including:
- said first connector having a first wireless transceiver inside the first part electrically connected to said first wired connection cable, said first wireless transceiver including a battery;
- said second connector having a second wireless transceiver inside the second part electrically connected to said second wired connected cable,
- said first and second wireless transceivers being configured to communicate with each other;
- a power supply connection between said telecommunication device and said hands-free communication device passing through said first and second wired connection cables, thereby providing power to charge said battery in said first wireless transceiver so that said first wireless transceiver is maintained in a charged ready state when said first and second connectors are joined;
- said first and second connectors while being mated to each other providing an audio electrical and mechanical link between the hands-free communication device and the telecommunication device while the first and second wireless transceivers simultaneously provide a wireless link between said hands-free communication device and the telecommunication device, so that if the audio electrical and mechanical link is interrupted, said first wireless transceiver is in a charged state for unbroken wireless communications between the hands-free communication device and the telecommunication device.

14. A wireless fall back in-line connector adapter for use with a hands-free communication system configured for audio communication between a hands-free communication device having a first wired connection cable and a telecommunication device having a second wired connection cable, the system comprising:
- a pair of first and second connectors having first and second parts, respectively, said first connector being electrically connected to said first wired connection cable, and said second connector being electrically connected to said second wired connection cable, said first and second connectors being mechanically and electrically separable from each other and further including:
- said first connector having a first wireless transceiver inside the first part electrically connected to said first wired connection cable;
- said second connector having a second wireless transceiver inside the second part electrically connected to said second wired connected cable,
- an activator for detecting connection status of the first and second connectors and in the event they are not connected, activating the first and second wireless transceivers;
- said first and second wireless transceivers being configured to communicate with each other only when said connection status is disconnected;

said first and second connectors while being mated to each other providing an audio electrical and mechanical link between the hands-free communication device and the telecommunication device while the first and second wireless transceivers provide a back-up wireless link between said hands-free communication device and the telecommunication device, so that if the audio electrical and mechanical link is interrupted, the hands-free communication device and the telecommunication device will remain in constant unbroken communication through wireless connection.

\* \* \* \* \*